United States Patent Office

2,822,314
Patented Feb. 4, 1958

2,822,314

THERAPEUTIC ANTIBIOTIC PREPARATION CONTAINING POLYMYXIN, NEOMYCIN AND GRAMICIDIN

Robert J. Ferlauto, Doylestown, and Russell E. Rhodes, Ardsley, Pa., assignors to Smith, Kline & French Laboratories, Philadelphia, Pa., a corporation of Pennsylvania No Drawing. Application April 29, 1953
Serial No. 352,034

3 Claims. (Cl. 167—65)

This invention relates to a therapeutic antibiotic preparation and, more particularly, relates to such a preparation which has particular utility for use in the gastro-intestinal tract and as a topical product for eyes, ears, nose and throat and other local areas.

The preparation in accordance with this invention comprises an admixture of polymyxin, neomycin and gramicidin. Although the proportions of the ingredients can vary widely, it has been found to be particularly advantageous to have the ingredients present in the proportions of from 10,000 to 1,000,000 units of polymyxin and from 1,000 to 100,000 units of neomycin in admixture with each milligram of gramicidin. Tyrothricin in an amount of about 5 times the desired amount of gramicidin can be utilized to provide for the presence of the gramicidin.

The antibiotic mixture in accordance with this invention can be used alone or in admixture with a diluent, such as, for example, terra alba, dextrose or starch. The diluent can take the form of any vehicle which is advantageous for the desired site of application, such as, for example, water for use internally, in the nasal passages or on the skin; a water suspension of pectins and kaolin for treatment of the intestines; an ointment base, such as polyethylene glycol or petrolatum, or an oil-water emulsion such as cold cream U. S. P. or vanishing cream U. S. P. for use on the skin; a lozenge primarily formed of sugar and mucilage for use in the mouth and throat. Numerous other vehicles known to the art can also be employed.

When the vehicle is an aqueous one, the gramicidin can be dissolved in, for example, a lower alcohol, such as ethyl, propyl, isobutyl or butyl alcohol, ethylene glycol, propylene glycol, acetone, acetic acid and dioxane and, if desired, a stabilizer, such as, for example, cetyl trimethyl ammonium bromide, octadecyl dimethyl ethyl ammonium bromide, cetyl dimethyl benzyl ammonium chloride and octadecyl diethyl benzyl ammonium chloride can be utilized.

It will be appreciated from the above that the antibiotic mixture may be used alone, or in any suitable pharmaceutical form.

When a diluent is used, the gramicidin will be present in an amount of from .25 to 500 mcgm./gm. of the final preparation and the polymyxin and neomycin in the proportions given above.

The conventional additives can be utilized with the preparation in accordance with this invention. Thus, for example, where the antibiotic mixture is utilized in a nose drop, a vasoconstrictor such as ephedrine, hydroxyamphetamine hydrobromide and an antihistamine, such as thenylpyramine or pyribenzamine can be added. Where the antibiotic mixture is to be utilized for the treatment of diarrhea, conventional adsorbents, such as pectin and kaolin, or antispasmodics, such as hyoscyamine and homatropine methyl bromide, and desired flavoring agents may be used in the preparation. Local anesthetics, such as, for example, dimethisoquin hydrochloride can be added to the antibiotic mixture in accordance with this invention when it is placed in a preparation for eye, ear, throat or skin.

This invention will be further clarified by the following examples of typical formulations utilizing the antibiotic mixture of this invention:

EXAMPLE 1

*Skin application*

| | | |
|---|---|---|
| Polymyxin | units | 66,000 |
| Neomycin | do | 6,000 |
| Gramicidin | mcgm | 650 |
| Ethyl alcohol | gm | 1 |
| Cetyl dimethyl benzyl ammonium chloride | mgm | 3.3 |

Water in an amount to bring the total weight to 30 gms.

EXAMPLE 2

*Nose drop*

| | | |
|---|---|---|
| Polymyxin | units | 66,000 |
| Neomycin | do | 6,000 |
| Gramicidin | mcgm | 650 |
| Propylene glycol | gm | 0.25 |
| Hydroxy-amphetamine hydrobromide | gm | 0.3 |
| Octadecyl dimethyl ethyl ammonium bromide | percent | .002 |
| Thenylpyramine hydrochloride | gm | 0.06 |

Water in an amount to bring the total weight to 30 gms.

EXAMPLE 3

*Oral suspension for diarrhea*

| | | |
|---|---|---|
| Polymyxin | units | 4,000,000 |
| Neomycin | do | 275,000 |
| Gramicidin | mcgm | 75,000 |
| Kaolin | gms | 37.5 |
| Pectin | gm | 1 |

Water in an amount to bring the total weight to 250 gms.

EXAMPLE 4

*Lozenge preparation*

| | | |
|---|---|---|
| Polymyxin | units | 25,000 |
| Neomycin | do | 10,000 |
| Gramicidin | mcgm | 2,500 |
| Cetyl dimethyl benzyl ammonium chloride | mgms | 20 |
| Dimethisoquin hydrochloride | mgms | 2 |
| Powdered sugar (sucrose) | gms | 10.8 |
| Powdered acacia | gms | 1.2 |

EXAMPLE 5

| | | |
|---|---|---|
| Polymyxin | units | 25,000 |
| Neomycin | do | 10,000 |
| Tyrothricin | mcgms | 12,500 |
| Powdered sugar (sucrose) | gms | 11.3 |
| Powdered acacia | gms | 1.5 |

EXAMPLE 6

*Ointment preparation for skin*

| | | |
|---|---|---|
| Polymyxin | units | 150,000 |
| Neomycin | do | 30,000 |
| Gramicidin | mcgms | 750 |
| Dimethisoquin hydrochloride | mgms | 150 |
| Cetyl dimethyl benzyl ammonium bromide | mgms | 30 |
| Stearyl alcohol | gms | 4 |
| Polyoxyethylene sorbitan monostearate | gms | .66 |
| Sorbitan monostearate | gms | .66 |
| Light mineral oil | gms | 1.66 |

Water in an amount sufficient to bring the total weight to 30 gms.

EXAMPLE 7

| | | |
|---|---|---|
| Polymyxin | units | 1,000,000 |
| Neomycin | do | 100,000 |
| Gramicidin | mgm | 1 |

EXAMPLE 8

| | | |
|---|---|---|
| Polymyxin | units | 2,000,000 |
| Neomycin | do | 500,000 |
| Gramicidin | mgms | 10 |

EXAMPLE 9

| | | |
|---|---|---|
| Polymyxin | units | 2,000,000 |
| Neomycin | do | 500,000 |
| Tyrothricin | mcgms | 50 |

EXAMPLE 10
Powder

| | | |
|---|---|---|
| Polymyxin | units | 66,000 |
| Neomycin | do | 6,000 |
| Gramicidin | mcgm | 650 |
| Talc | gms | 15 |

It is not desired to be limited except as set forth in the following claims, the above examples being merely by way of specific illustration of the invention.

What is claimed is:

1. An antibiotic preparation containing polymyxin, neomycin and gramicidin in the proportions of from 10,000 to 1,000,000 units of polymyxin and from 1,000 to 100,000 units of neomycin for 1 milligram of gramicidin.

2. An antibiotic preparation containing polymyxin, neomycin and gramicidin in the proportions of from 10,000 to 1,000,000 units of polymyxin and from 1,000 to 100,000 units of neomycin for 1 milligram of gramicidin and a diluent.

3. An antibiotic preparation containing polymyxin, neomycin and gramicidin in the proportions of from 10,000 to 1,000,000 units of polymyxin and from 1,000 to 100,000 units of neomycin for 1 milligram of gramicidin and a diluent, each gram of the antibiotic preparation containing from .25 to 500 micrograms of gramicidin.

References Cited in the file of this patent

UNITED STATES PATENTS 2,730,483    Mast _____ Jan. 10, 1956

OTHER REFERENCES

Jawetz et al.: "Suppression of the Intestinal Flora in Man by Means of Mixtures of Poorly Absorbed Antibiotics," Gastroenterology, 21 (1), May 1952, pp. 139–147.

Spectrocin: Modern Drugs, October 1952, pp. 228 and 230.

Brownlee: "Chemotherapy and Pharmacology of Aerosporin," The Lancet, Jan. 24, 1948, pp. 127–132.

Graves: "Antibiotics in Otitis Externa," Drug and Cos. Ind., September 1952, p. 371.

Neter: "Synergistic Effects of Polymyxin B and Terramycin," J. Urology, May 1952, pp. 773–775.